(12) United States Patent
Hudman

(10) Patent No.: US 11,487,120 B2
(45) Date of Patent: Nov. 1, 2022

(54) POLARIZATION COMPENSATION FOR WIRE GRID POLARIZER OF HEAD-MOUNTED DISPLAY SYSTEM

(71) Applicant: Valve Corporation, Bellevue, WA (US)

(72) Inventor: Joshua Mark Hudman, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 87 days.

(21) Appl. No.: 17/165,570

(22) Filed: Feb. 2, 2021

(65) Prior Publication Data
US 2021/0247611 A1 Aug. 12, 2021

Related U.S. Application Data

(60) Provisional application No. 62/971,187, filed on Feb. 6, 2020.

(51) Int. Cl.
| | |
|---|---|
| *G02B 27/01* | (2006.01) |
| *G02F 1/1335* | (2006.01) |
| *G02F 1/1337* | (2006.01) |
| *G02F 1/13363* | (2006.01) |

(52) U.S. Cl.
CPC ....... *G02B 27/0172* (2013.01); *G02F 1/1337* (2013.01); *G02F 1/133548* (2021.01); *G02F 1/133638* (2021.01); *G02F 2202/40* (2013.01)

(58) Field of Classification Search
CPC .................. G02B 27/0172; G02F 2202/40
USPC ........................................................ 349/11
See application file for complete search history.

(56) References Cited

U.S. PATENT DOCUMENTS

| | | | |
|---|---|---|---|
| 6,805,445 B2 | 10/2004 | Silverstein et al. |
| 6,982,773 B2 | 1/2006 | Kurtz et al. |
| 7,160,017 B2 | 1/2007 | Lee et al. |
| 7,295,312 B1 | 11/2007 | Gerhart et al. |
| (Continued) | | |

OTHER PUBLICATIONS

Hornburg et al., "Multiband retardation control using multi-twist retarders," Proc. of SPIE, Polarization: Measurement, Analysis, and Remote Sensing XI, vol. 9099, 90990Z, 2014, 9 pages.
Hornburg et al., "Wide color gamut multi-twist retarders," Proc. of SPIE, Emerging Liquid Crystal Technologies X, vol. 9384, 93840W, 2015, 11 pages.

(Continued)

*Primary Examiner* — Nathanael R Briggs
*Assistant Examiner* — William D Peterson
(74) *Attorney, Agent, or Firm* — Seed Intellectual Property Law Group LLP

(57) ABSTRACT

The present disclosure relates generally to techniques for improving the performance and efficiency of optical systems, such as optical systems for using head-mounted display system. The optical systems of the present disclosure may include polarized catadioptric optics, or "pancake optics," which utilize a wire grid polarizer as a reflective polarizer. Wire grid polarizers may not perform uniformly over wavelength or over varying angles of incidence. To improve performance, a spatially varying polarizer is provided in the optical system that operates to provide polarization compensation for the wire grid polarizer so that the wire grid polarizer performs more uniformly over wavelength and/or over incidence angles (e.g., on-axis and off-axis). The spatially varying polarizer may be formed of a liquid crystal material, such as a multi-twist retarder.

20 Claims, 6 Drawing Sheets

(56) References Cited

U.S. PATENT DOCUMENTS

| | | |
|---|---|---|
| 8,004,675 B2 | 8/2011 | Lefaudeux |
| 8,235,533 B2 | 8/2012 | Hudman et al. |
| 8,368,889 B2 | 2/2013 | Schwiegerling et al. |
| 8,982,313 B2 | 3/2015 | Escuti et al. |
| 9,298,041 B2 | 3/2016 | Escuti et al. |
| 9,335,586 B2 | 5/2016 | Escuti et al. |
| 9,410,677 B2 | 8/2016 | Wheatley et al. |
| 9,557,568 B1 * | 1/2017 | Ouderkirk .......... B29D 11/0073 |
| 10,203,489 B2 | 2/2019 | Khan et al. |
| 10,394,040 B2 | 8/2019 | Gollier et al. |
| 10,545,348 B1 | 1/2020 | Lu et al. |
| 2011/0310220 A1 | 12/2011 | McEldowney |
| 2013/0286479 A1 | 10/2013 | Sung et al. |
| 2015/0131311 A1 | 5/2015 | Wheatley et al. |
| 2016/0182889 A1 | 6/2016 | Olmstead |
| 2016/0349516 A1 | 12/2016 | Alexander et al. |
| 2019/0243147 A1 | 8/2019 | Smithwick et al. |
| 2019/0377183 A1 | 12/2019 | Sharp |
| 2020/0301147 A1 | 9/2020 | Klug |

OTHER PUBLICATIONS

ImagineOptix, "Consumer Electronics Optics," Augmented and Virtual Reality Optics Technology in Consumer Electronics—ImagineOptix, retrieved from <https://www.imaginoptix.com/applications/consumer-electronics/>, on Dec. 17, 2019, 3 pages.

Komanduri et al., "Multi-twist retarders for broadband polarization transformation," Proc. of SPIE, Emerging Liquid Crystal Technologies VII, vol. 8279, 82790E, 2012, 10 pages.

Komanduri et al., "Multi-twist retarders: broadband retardation control using self-aligning reactive liquid crystal layers," Optics Express, Optical Society of America, vol. 21, No. 1 Jan. 14, 2013, 17 pages.

Perreault, "Triple Wollaston-prism complete-Stokes imaging polarimeter," Optics Letters, Optical Society of America, vol. 38, No. 19, Oct. 1, 2013, 4 pages.

International Search Report and Written Opinion, dated Apr. 22, 2021, for International Application No. PCT/US2021/016219, 10 pages.

* cited by examiner

POLARIZATION COMPENSATION FOR WIRE GRID POLARIZER OF HEAD-MOUNTED DISPLAY SYSTEM

BACKGROUND

Technical Field

The present disclosure generally relates to optical systems, and more particularly, to improving the efficiency and performance of optical systems for head-mounted display systems.

Description of the Related Art

One current generation of virtual reality ("VR") experiences is created using head-mounted displays ("HMDs"), which can be tethered to a stationary computer (such as a personal computer ("PC"), laptop, or game console), combined and/or integrated with a smart phone and/or its associated display, or self-contained. Generally, HMDs are display devices, worn on the head of a user, which have a small display device in front of one (monocular HMD) or each eye (binocular HMD). The display units are typically miniaturized and may include CRT, LCD, Liquid crystal on silicon (LCoS), OLED technologies, or laser scan beam displays, for example. A binocular HMD has the potential to display a different image to each eye. This capability is used to display stereoscopic images.

Demand for displays with heightened performance has increased with the development of smart phones, high-definition televisions, as well as other electronic devices. The growing popularity of virtual reality and augmented reality systems, particularly those using HMDs, has further increased such demand. Virtual reality systems typically envelop a wearer's eyes completely and substitute a "virtual" reality for the actual or physical view (or actual reality) in front of the wearer, while augmented reality systems typically provide a semi-transparent or transparent overlay of one or more screens in front of a wearer's eyes such that actual view is augmented with additional information, and mediated reality systems may similarly present information to a viewer that combines real-world elements with virtual elements.

However, such head mounted displays, with reduced distance between a viewer's eye and the display and often with a fully obscured field of view, have increased the performance requirements of displays in ways that traditional displays cannot satisfy, let alone to do so at cost-effective levels. Micro displays, such as OLED micro displays, are much smaller than traditional displays but involve additional challenges. For instance, micro displays require very short focal length lenses. Further, because the eye pupil size of a user is fixed, the F/# of a lens of an HMD which uses a micro display is decreased, which tends to increase the aberrations of a particular lens system. Moreover, micro displays have small pixels. This increase the spatial resolution of the HMD optic further increases the challenge to design and manufacture the lens for such an HMD.

BRIEF SUMMARY

A head-mounted display system may be summarized as including a display subsystem operative to generate images comprising linearly polarized light; and an optical system, including: a lens element that receives light from the display subsystem, the lens element comprising a partially reflective surface; a wire grid polarizer that receives light from the lens element; a quarter wave plate positioned between the lens element and the wire grid polarizer; and a spatially varying polarizer positioned between the display subsystem and the lens element, the spatially varying polarizer having a retardance that varies across an optical window of the spatially varying polarizer to compensate off axis light incident on the wire grid polarizer.

The spatially varying polarizer may include a multi-twist retarder. The spatially varying polarizer may provide quarter-wave retardation at a center of the optical window, and may gradually decrease the retardation toward the periphery of the optical window. The spatially varying polarizer may provide octadic-wave retardation at the periphery of the window. The spatially varying polarizer may provide a first retardation at a center of the optical window and may provide a second retardation at the periphery of the optical window, wherein the second retardation is less than the first retardation. The retardation of the spatially varying polarizer may vary linearly or non-linearly across the optical window.

The head-mounted display system may further include control circuitry operatively coupled to the spatially varying polarizer, the control circuitry operative to selectively adjust the retardation provided by the spatially varying polarizer.

A head-mounted display system may be summarized as including a display subsystem operative to generate images comprising linearly polarized light; and an optical system, including: a quarter wave plate that receives light from the display subsystem; a lens element that receives light from the quarter wave plate, the lens element comprising a partially reflective surface; a wire grid polarizer that receives light from the lens element; and a spatially varying polarizer positioned between the lens element and the wire grid polarizer, the spatially varying polarizer having a retardance that varies across an optical window of the spatially varying polarizer to compensate off axis light incident on the wire grid polarizer.

The spatially varying polarizer may include a multi-twist retarder. The spatially varying polarizer may provide quarter-wave retardation at a center of the optical window, and may gradually decrease the retardation toward the periphery of the optical window. The spatially varying polarizer may provide octadic-wave retardation at the periphery of the window. The spatially varying polarizer may provide a first retardation at a center of the optical window and may provide a second retardation at the periphery of the optical window, wherein the second retardation is less than the first retardation. The retardation of the spatially varying polarizer may vary linearly or non-linearly across the optical window.

The head-mounted display system may further include control circuitry operatively coupled to the spatially varying polarizer, the control circuitry operative to selectively adjust the retardation provided by the spatially varying polarizer.

A head-mounted display system may be summarized as including first and second near-to-eye display systems, each of the first and second near-to eye display systems including: a display subsystem operative to generate images comprising linearly polarized light; and an optical subsystem, including: a lens element that receives light from the display subsystem, the lens element comprising a partially reflective surface; a wire grid polarizer that receives light from the lens element; a quarter wave plate positioned between the lens element and the wire grid polarizer; and a spatially varying polarizer positioned between the display subsystem and the lens element, the spatially varying polarizer having a retardance that varies across an optical window of the spatially varying polarizer to compensate off axis light incident on the wire grid polarizer.

The spatially varying polarizer may include a multi-twist retarder. The spatially varying polarizer may provide quarter-wave retardation at a center of the optical window, and may gradually decrease the retardation toward the periphery of the optical window.

The spatially varying polarizer may provide octadic-wave retardation at the periphery of the window. The spatially varying polarizer may provide a first retardation at a center of the optical window and may provide a second retardation at the periphery of the optical window. The retardation of the spatially varying polarizer may vary linearly or non-linearly across the optical window.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
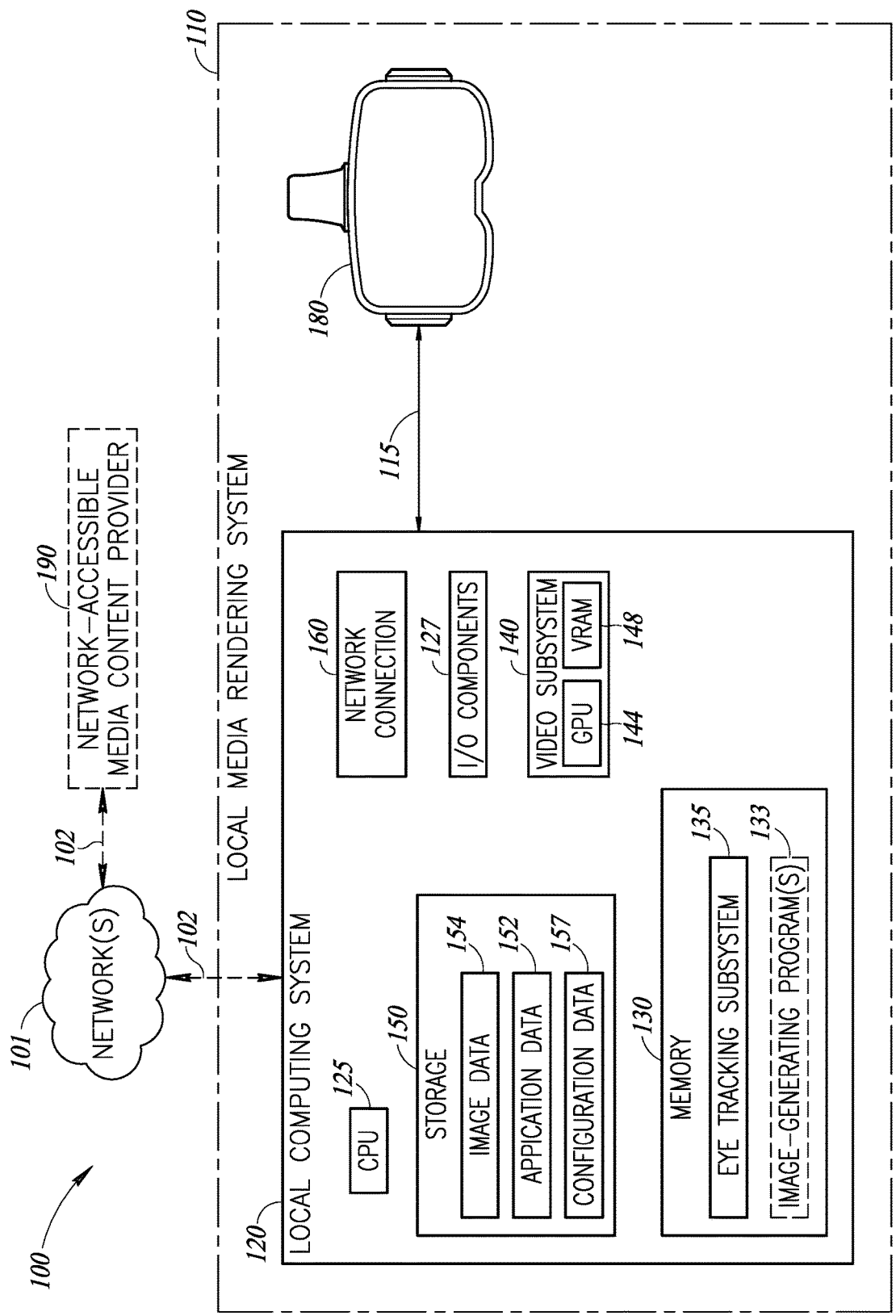
FIG. 1 is a schematic diagram of a networked environment that includes one or more systems suitable for performing at least some techniques described in the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

The present disclosure relates generally to techniques for improving the performance and efficiency of optical systems, such as optical systems for using head-mounted display system. The optical systems of the present disclosure may include polarized catadioptric optics, or "pancake optics," which utilize a wire grid polarizer as a reflective polarizer. Wire grid polarizers may not perform uniformly over wavelength or over varying angles of incidence. In at least some implementations of the present disclosure, a spatially varying polarizer is provided in the optical system that operates to provide polarization compensation for the wire grid polarizer so that the wire grid polarizer performs more uniformly over wavelength and/or over incidence angles (e.g., on-axis and off-axis). The spatially varying polarizer may be formed of a multi-twist retarder, as discussed further below.

Initially, an example head-mounted display device application for the techniques described herein is discussed with reference to FIGS. 1-4. Then, with reference to FIGS. 5 and 6, example implementations of display systems that include features of the present disclosure are discussed.

Example Head-Mounted Display System and Environment

Figure 2:
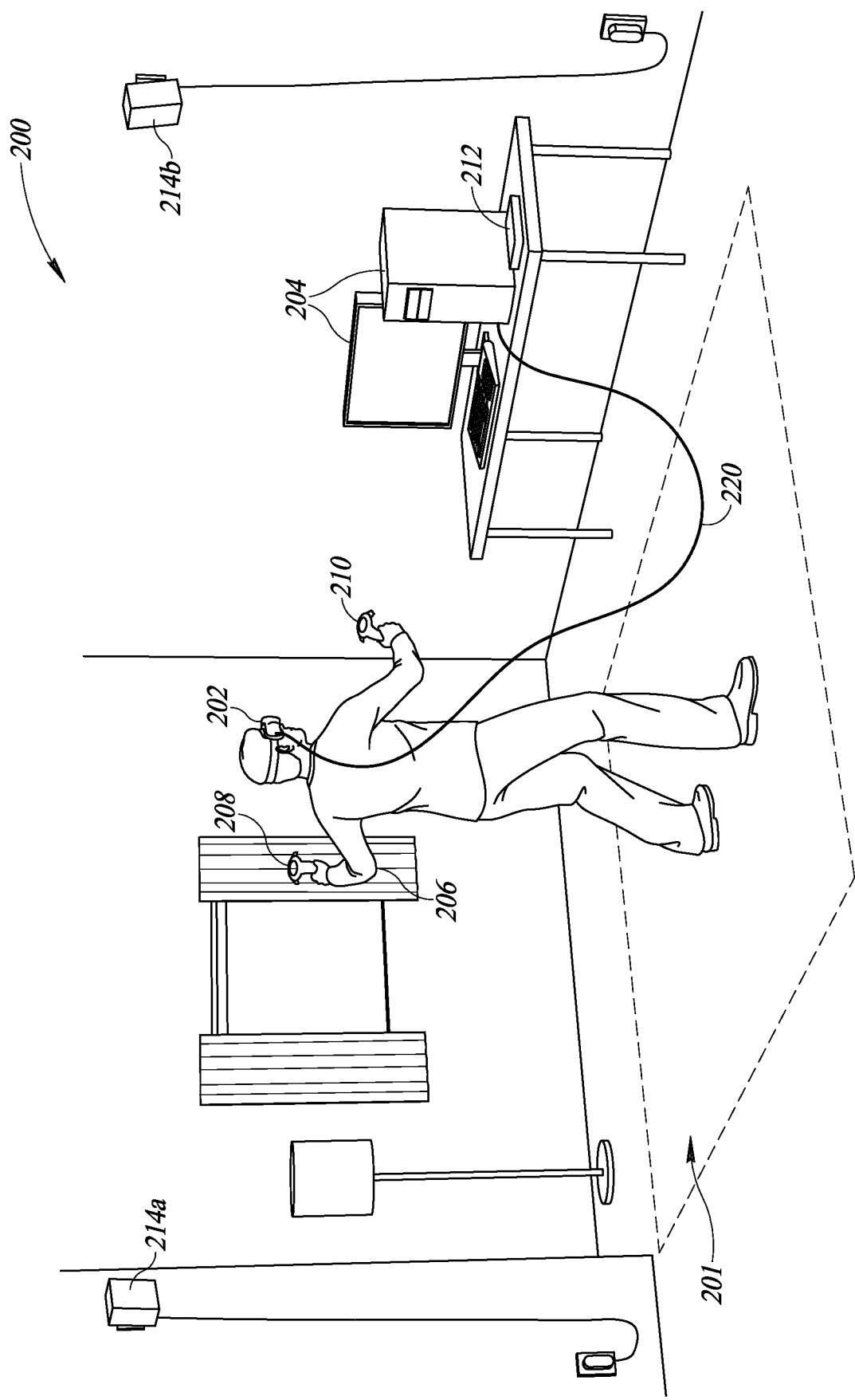
FIG. 2 is a diagram illustrating an example environment in which at least some of the described techniques are used with an example head-mounted display device that is tethered to a video rendering computing system and providing a virtual reality display to a user.

FIG. 1 is a schematic diagram of a networked environment 100 that includes a local media rendering (LMR) system 110 (e.g., a gaming system), which includes a local computing system 120 and display device 180 (e.g., an HMD device with two display panels) suitable for performing at least some techniques described herein. In the depicted embodiment of FIG. 1, the local computing system 120 is communicatively connected to display device 180 via transmission link 115 (which may be wired or tethered, such as via one or more cables as illustrated in FIG. 2 (cable 220), or instead may be wireless). In other embodiments, the local computing system 120 may provide encoded image data for display to a panel display device (e.g., a TV, console or monitor) via a wired or wireless link, whether in addition to or instead of the HMD device 180, and the display devices each includes one or more addressable pixel arrays. In various embodiments, the local computing system 120 may include a general purpose computing system; a gaming console; a video stream processing device; a mobile computing device (e.g., a cellular telephone, PDA, or other mobile device); a VR or AR processing device; or other computing system.

In the illustrated embodiment, the local computing system 120 has components that include one or more hardware processors (e.g., centralized processing units, or "CPUs") 125, memory 130, various I/O ("input/output") hardware components 127 (e.g., a keyboard, a mouse, one or more gaming controllers, speakers, microphone, IR transmitter and/or receiver, etc.), a video subsystem 140 that includes one or more specialized hardware processors (e.g., graphics processing units, or "GPUs") 144 and video memory (VRAM) 148, computer-readable storage 150, and a network connection 160. Also in the illustrated embodiment, an embodiment of an eye tracking subsystem 135 executes in memory 130 in order to perform at least some of the described techniques, such as by using the CPU(s) 125 and/or GPU(s) 144 to perform automated operations that implement those described techniques, and the memory 130 may optionally further execute one or more other programs 133 (e.g., to generate video or other images to be displayed, such as a game program). As part of the automated operations to implement at least some techniques described herein, the eye tracking subsystem 135 and/or programs 133 executing in memory 130 may store or retrieve various types of data, including in the example database data structures of storage 150, in this example, the data used may include various types of image data information in database ("DB") 154, various types of application data in DB 152, various types of configuration data in DB 157, and may include additional information, such as system data or other information.

The LMR system 110 is also, in the depicted embodiment, communicatively connected via one or more computer networks 101 and network links 102 to an exemplary network-accessible media content provider 190 that may further provide content to the LMR system 110 for display, whether in addition to or instead of the image-generating programs 133. The media content provider 190 may include one or more computing systems (not shown) that may each have components similar to those of local computing system 120, including one or more hardware processors, I/O components, local storage devices and memory, although some details are not illustrated for the network-accessible media content provider for the sake of brevity.

It will be appreciated that, while the display device 180 is depicted as being distinct and separate from the local computing system 120 in the illustrated embodiment of FIG. 1, in certain embodiments some or all components of the local media rendering system 110 may be integrated or housed within a single device, such as a mobile gaming device, portable VR entertainment system, HMD device, etc. In such embodiments, transmission link 115 may, for example, include one or more system buses and/or video bus architectures.

As one example involving operations performed locally by the local media rendering system 120, assume that the local computing system is a gaming computing system, such that application data 152 includes one or more gaming applications executed via CPU 125 using memory 130, and that various video frame display data is generated and/or processed by the image-generating programs 133, such as in conjunction with GPU 144 of the video subsystem 140. In order to provide a quality gaming experience, a high volume of video frame data (corresponding to high image resolution for each video frame, as well as a high "frame rate" of approximately 60-180 of such video frames per second) is generated by the local computing system 120 and provided via the wired or wireless transmission link 115 to the display device 180.

It will also be appreciated that computing system 120 and display device 180 are merely illustrative and are not intended to limit the scope of the present disclosure. The computing system 120 may instead include multiple interacting computing systems or devices, and may be connected to other devices that are not illustrated, including through one or more networks such as the Internet, via the Web, or via private networks (e.g., mobile communication networks, etc.). More generally, a computing system or other computing node may include any combination of hardware or software that may interact and perform the described types of functionality, including, without limitation, desktop or other computers, game systems, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. The display device 180 may similarly include one or more devices with one or more display panels of various types and forms, and optionally include various other hardware and/or software components.

It will also be appreciated that, while various items are illustrated as being stored in memory or on storage while being used, these items or portions of them may be transferred between memory and other storage devices for purposes of memory management or data integrity. Thus, in some embodiments, some or all of the described techniques may be performed by hardware that include one or more processors or other configured hardware circuitry or memory or storage, such as when configured by one or more software programs and/or data structures (e.g., by execution of software instructions of the one or more software programs and/or by storage of such software instructions and/or data structures). Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 2 illustrates an example environment 200 in which at least some of the described techniques are used with an example HMD device 202 that is coupled to a video rendering computing system 204 via a tethered connection 220 (or a wireless connection in other embodiments) to provide a virtual reality display to a human user 206. The user wears the HMD device 202 and receives displayed information via the HMD device from the computing system 204 of a simulated environment different from the actual physical environment, with the computing system acting as an image rendering system that supplies images of the simulated environment to the HMD device for display to the user, such as images generated by a game program and/or other software program executing on the computing system. The user is further able to move around within a tracked volume 201 of the actual physical environment 200 in this example, and may further have one or more I/O ("input/output") devices to allow the user to further interact with the simulated environment, which in this example includes hand-held controllers 208 and 210.

In the illustrated example, the environment 200 may include one or more base stations 214 (two shown, labeled base stations 214a and 214b) that may facilitate tracking of the HMD device 202 or the controllers 208 and 210. As the user moves location or changes orientation of the HMD device 202, the position of the HMD device is tracked, such as to allow a corresponding portion of the simulated environment to be displayed to the user on the HMD device, and the controllers 208 and 210 may further employ similar techniques to use in tracking the positions of the controllers (and to optionally use that information to assist in determining or verifying the position of the HMD device). After the tracked position of the HMD device 202 is known, corresponding information is transmitted to the computing system 204 via the tether 220 or wirelessly, which uses the tracked position information to generate one or more next images of the simulated environment to display to the user.

There are numerous different methods of positional tracking that may be used in the various implementations of the present disclosure, including, but not limited to, acoustic tracking, inertial tracking, magnetic tracking, optical tracking, combinations thereof, etc.

In at least some implementations, the HMD device 202 may include one or more optical receivers or sensors that may be used to implement tracking functionality or other aspects of the present disclosure. For example, the base stations 214 may each sweep an optical signal across the tracked volume 201. Depending on the requirements of each particular implementation, each base station 214 may generate more than one optical signal. For example, while a single base station 214 is typically sufficient for six-degree-of-freedom tracking, multiple base stations (e.g., base stations 214a, 214b) may be necessary or desired in some embodiments to provide robust room-scale tracking for HMD devices and peripherals. In this example, optical receivers are incorporated into the HMD device 202 and or other tracked objects, such as the controllers 208 and 210. In at least some implementations, optical receivers may be paired with an accelerometer and gyroscope Inertial Measurement Unit ("IMU") on each tracked device to support low-latency sensor fusion.

In at least some implementations, each base station 214 includes two rotors which sweep a linear beam across the tracked volume 201 on orthogonal axes. At the start of each sweep cycle, the base station 214 may emit an omnidirectional light pulse (referred to as a "sync signal") that is visible to all sensors on the tracked objects. Thus, each sensor computes a unique angular location in the swept volume by timing the duration between the sync signal and the beam signal. Sensor distance and orientation may be solved using multiple sensors affixed to a single rigid body.

The one or more sensors positioned on the tracked objects (e.g., HMD device 202, controllers 208 and 210) may comprise an optoelectronic device capable of detecting the modulated light from the rotor. For visible or near-infrared (NIR) light, silicon photodiodes and suitable amplifier/detector circuitry may be used. Because the environment 200 may contain static and time-varying signals (optical noise) with similar wavelengths to the signals of the base stations 214 signals, in at least some implementations the base station light may be modulated in such a way as to make it easy to differentiate from any interfering signals, and/or to filter the sensor from any wavelength of radiation other than that of base station signals.

Inside-out tracking is also a type positional tracking that may be used to track the position of the HMD device 202 and/or other objects (e.g., controllers 208 and 210, tablet computers, smartphones). Inside-out tracking differs from outside-in tracking by the location of the cameras or other sensors used to determine the HMD' s position. For inside-out tracking, the camera or sensors are located on the HMD, or object being tracked, while in outside-out tracking the camera or sensors are placed in a stationary location in the environment.

An HMD that utilizes inside-out tracking utilizes one or more cameras to "look out" to determine how its position changes in relation to the environment. When the HMD moves, the sensors readjust their place in the room and the virtual environment responds accordingly in real-time. This type of positional tracking can be achieved with or without markers placed in the environment. The cameras that are placed on the HMD observe features of the surrounding environment. When using markers, the markers are designed to be easily detected by the tracking system and placed in a specific area. With "markerless" inside-out tracking, the HMD system uses distinctive characteristics (e.g., natural features) that originally exist in the environment to determine position and orientation. The HMD system's algorithms identify specific images or shapes and use them to calculate the device's position in space. Data from accelerometers and gyroscopes can also be used to increase the precision of positional tracking.

Figure 3:
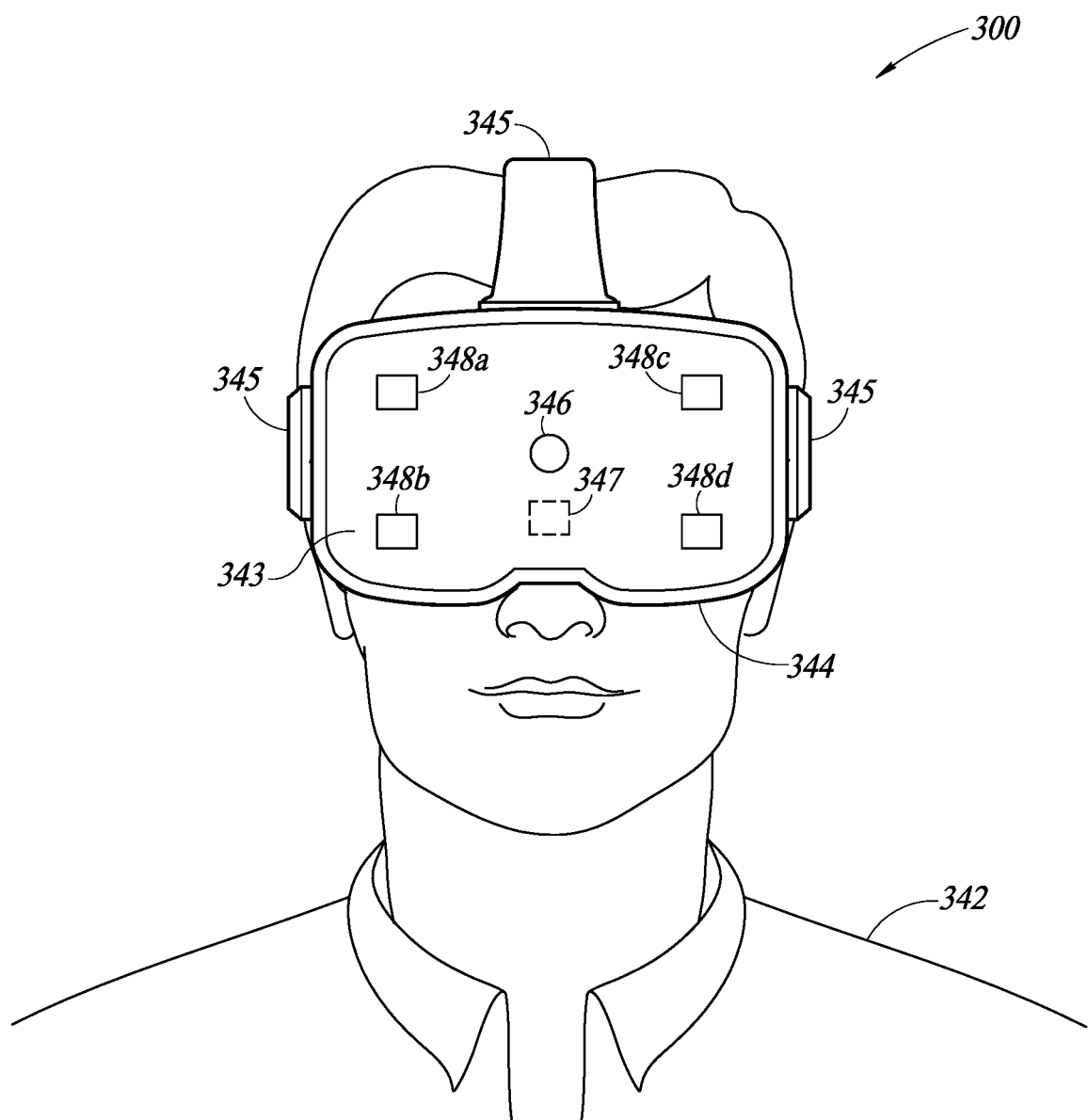
FIG. 3 is a front pictorial diagram of an example HMD device having binocular display subsystems.

FIG. 3 shows information 300 illustrating a front view of an example HMD device 344 when worn on the head of a user 342. The HMD device 344 includes a front-facing structure 343 that supports a front-facing or forward camera 346 and a plurality of sensors 348a-348d (collectively 348) of one or more types. As one example, some or all of the sensors 348 may assist in determining the location and orientation of the device 344 in space, such as light sensors to detect and use light information emitted from one or more external devices (not shown, e.g., base stations 214 of FIG. 2). As shown, the forward camera 346 and the sensors 348 are directed forward toward an actual scene or environment (not shown) in which the user 342 operates the HMD device 344. The actual physical environment may include, for example, one or more objects (e.g., walls, ceilings, furniture, stairs, cars, trees, tracking markers, or any other types of objects). The particular number of sensors 348 may be fewer or more than the number of sensors depicted. The HMD device 344 may further include one or more additional components that are not attached to the front-facing structure (e.g., are internal to the HMD device), such as an IMU (inertial measurement unit) 347 electronic device that measures and reports the HMD device's 344 specific force, angular rate, and/or the magnetic field surrounding the HMD device (e.g., using a combination of accelerometers and gyroscopes, and optionally, magnetometers). The HMD device may further include additional components that are not shown, including one or more display panels and optical lens systems that are oriented toward eyes (not shown) of the user and that optionally have one or more attached internal motors to change the alignment or other positioning of one or more of the optical lens systems and/or display panels within the HMD device, as discussed in greater detail below with respect to FIG. 4.

The illustrated example of the HMD device 344 is supported on the head of user 342 based at least in part on one or more straps 345 that are attached to the housing of the HMD device 344 and that extend wholly or partially around the user's head. While not illustrated here, the HMD device 344 may further have one or more external motors, such as attached to one or more of the straps 345, and automated corrective actions may include using such motors to adjust such straps in order to modify the alignment or other positioning of the HMD device on the head of the user. It will be appreciated that HMD devices may include other support structures that are not illustrated here (e.g., a nose piece, chin strap, etc.), whether in addition to or instead of the illustrated straps, and that some embodiments may include motors attached one or more such other support structures to similarly adjust their shape and/or locations to modify the alignment or other positioning of the HMD device on the head of the user. Other display devices that are not affixed to the head of a user may similarly be attached to or part of one or structures that affect the positioning of the display device, and may include motors or other mechanical actuators in at least some embodiments to similarly modify their shape and/or locations to modify the alignment or other positioning of the display device relative to one or more pupils of one or more users of the display device.

Figure 4:
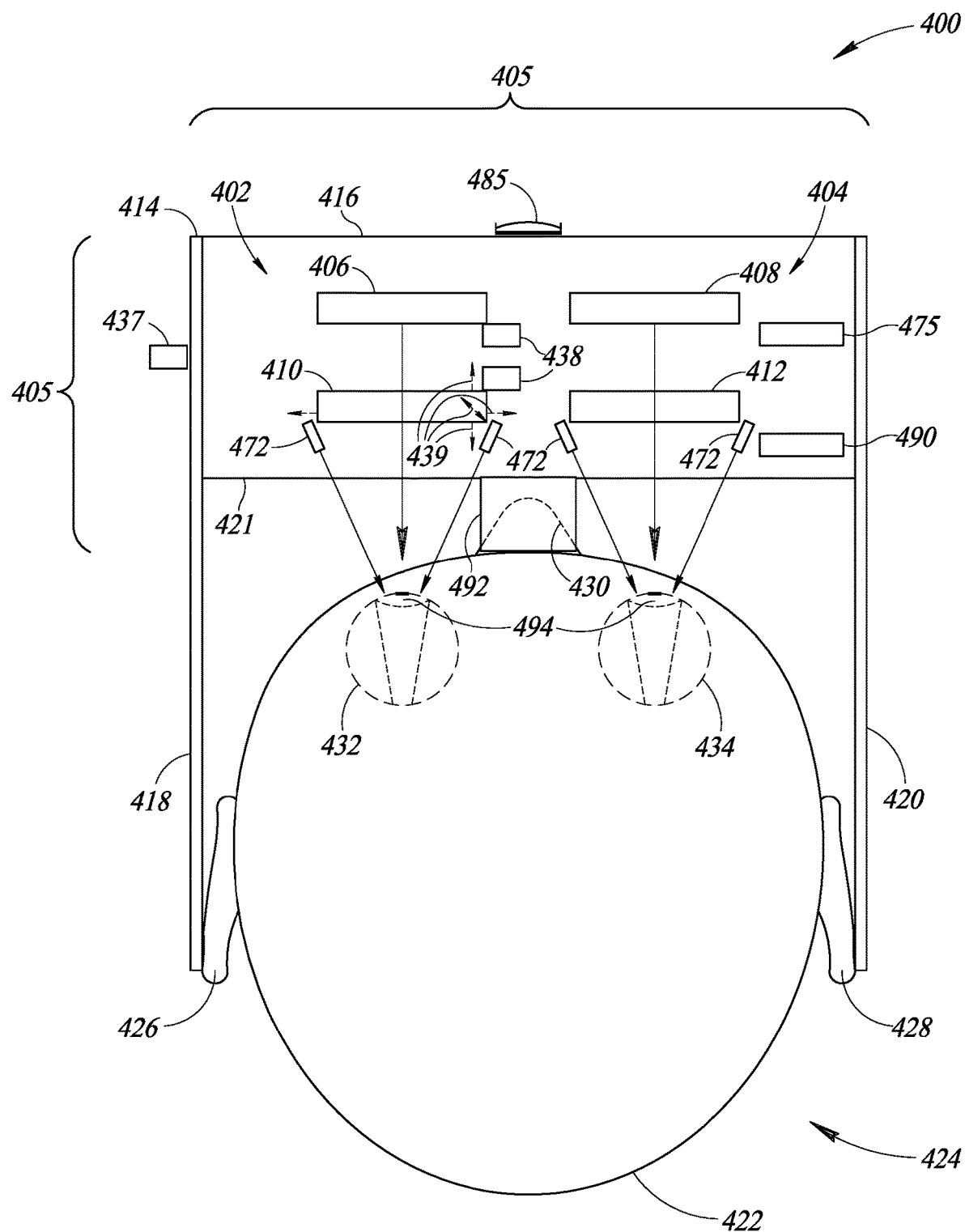
FIG. 4 illustrates a top plan view of an HMD device having binocular display subsystems and various sensors, according to an example embodiment of the present disclosure.

FIG. 4 illustrates a simplified top plan view 400 of an HMD device 405 that includes a pair of near-to-eye display systems 402 and 404. The HMD device 405 may, for example, be the same or similar HMD devices illustrated in FIGS. 1-3 or a different HMD device, and the HMD devices discussed herein may further be used in the examples discussed further below. The near-to-eye display systems 402 and 404 of FIG. 4 include display panels 406 and 408, respectively (e.g., OLED micro-displays, LCD displays), and respective optical lens systems 410 and 412 that each have one or more optical lenses. The display systems 402 and 404 may be mounted to or otherwise positioned within a housing (or frame) 414, which includes a front-facing portion 416 (e.g., the same or similar to the front-facing surface 343 of FIG. 3), a left temple 418, right temple 420 and interior surface 421 that touches or is proximate to a face of a wearer user 424 when the HMD device is worn by the user. The two display systems 402 and 404 may be secured to the housing 414 in an eye glasses arrangement which can be worn on the head 422 of a wearer user 424, with the left temple 418 and right temple 420 resting over the user's ears 426 and 428, respectively, while a nose assembly 492 may rest over the user's nose 430. In the example of FIG. 4, the HMD device 405 may be supported on the head of the user in part or in whole by the nose display and/or the right and left over-ear temples, although straps (not shown) or other structures may be used in some embodiments to secure the HMD device to the head of the user, such as the embodiments shown in FIGS. 2 and 3. The housing 414 may be shaped and sized to position each of the two optical lens systems 410 and 412 in front of one of the user's eyes 432 and 434, respectively, such that a target location of each pupil 494 is centered vertically and horizontally in front of the respective optical lens systems and/or display panels. Although the housing 414 is shown in a simplified manner similar to eyeglasses for explanatory purposes, it should be appreciated that in practice more sophisticated structures (e.g., goggles, integrated headband, helmet, straps, etc.) may be used to support and position the display systems 402 and 404 on the head 422 of user 424.

The HMD device 405 of FIG. 4, and the other HMD devices discussed herein, is capable of presenting a virtual reality display to the user, such as via corresponding video presented at a display rate such as 30 or 60 or 90 frames (or images) per second, while other embodiments of a similar system may present an augmented reality display to the user. Each of the displays 406 and 408 of FIG. 4 may generate light which is transmitted through and focused by the respective optical lens systems 410 and 412 onto the eyes 432 and 434, respectively, of the user 424. The pupil 494 aperture of each eye, through which light passes into the eye, will typically have a pupil size ranging from 2 mm (millimeters) in diameter in very bright conditions to as much as 8 mm in dark conditions, while the larger iris in which the pupil is contained may have a size of approximately 12 mm—the pupil (and enclosing iris) may further typically move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 424 as images and/or video. In some implementations, the distance between each of the optical lens systems 410 and 412 and the user's eyes 432 and 434 may be relatively short (e.g., less than 30 mm, less than 20 mm), which advantageously causes the HMD device to appear lighter to the user since the weight of the optical lens systems and the display systems are relatively close to the user's face, and also may provide the user with a greater field of view. While not illustrated here, some embodiments of such an HMD device may include various additional internal and/or external sensors.

In the illustrated embodiment, the HMD device 405 of FIG. 4 further includes hardware sensors and additional components, such as to include one or more accelerometers and/or gyroscopes 490 (e.g., as part of one or more IMU units). As discussed in greater detail elsewhere herein, values from the accelerometer(s) and/or gyroscopes may be used to locally determine an orientation of the HMD device. In addition, the HMD device 405 may include one or more front-facing cameras, such as camera(s) 485 on the exterior of the front portion 416, and whose information may be used as part of operations of the HMD device, such as for providing AR functionality or positioning functionality. Furthermore, the HMD device 405 may further include other components 475 (e.g., electronic circuits to control display of images on the display panels 406 and 408, internal storage, one or more batteries, position tracking devices to interact with external base stations, etc.), as discussed in greater detail elsewhere herein. Other embodiments may not include one or more of the components 475, 485 and/or 490. While not illustrated here, some embodiments of such an HMD device may include various additional internal and/or external sensors, such as to track various other types of movements and position of the user's body, eyes, controllers, etc.

In the illustrated embodiment, the HMD device 405 of FIG. 4 further includes hardware sensors and additional components that may be used by disclosed embodiments as part of the described techniques for determining user pupil or gaze direction, which may be provided to one or more components associated with the HMD device for use thereby, as discussed elsewhere herein. The hardware sensors in this example include one or more eye tracking assemblies 472 of an eye tracking subsystem that are mounted on or near the display panels 406 and 408 and/or located on the interior surface 421 near the optical lens systems 410 and 412 for use in acquiring information regarding the actual locations of the user's pupils 494, such as separately for each pupil in this example.

Each of the eye tracking assemblies 472 may include one or more light sources (e.g., IR LEDs) and one or more light detectors (e.g., silicon photodiodes). Further, although only four total eye tracking assemblies 472 are shown in FIG. 4 for clarity, it should be appreciated that in practice a different number of eye tracking assemblies may be provided. In some embodiments, a total of eight eye tracking assemblies 472 are provided, four eye tracking assemblies for each eye of the user 424. Further, in at least some implementations, each eye tracking assembly includes a light source directed at one of the user's 424 eyes 432 and 434, a light detector positioned to receive light reflected by the respective eye of the user, and a polarizer positioned and configured to prevent light that is reflected via specular reflection from being imparted on the light detector.

As discussed in greater detail elsewhere herein, information from the eye tracking assemblies 472 may be used to determine and track the user's gaze direction during use of the HMD device 405. Furthermore, in at least some embodiments, the HMD device 405 may include one or more internal motors 438 (or other movement mechanisms) that may be used to move 439 the alignment and/or other positioning (e.g., in the vertical, horizontal left-and-right and/or horizontal front-and-back directions) of one or more of the optical lens systems 410 and 412 and/or display panels 406 and 408 within the housing of the HMD device 405, such as to personalize or otherwise adjust the target pupil location of one or both of the near-to-eye display systems 402 and 404 to correspond to the actual locations of one or both of the pupils 494. Such motors 438 may be controlled by, for example, user manipulation of one or more controls 437 on the housing 414 and/or via user manipulation of one or more associated separate I/O controllers (not shown). In other embodiments the HMD device 405 may control the alignment and/or other positioning of the optical lens systems 410 and 412 and/or display panels 406 and 408 without such motors 438, such as by use of adjustable positioning mechanisms (e.g., screws, sliders, ratchets, etc.) that are manually changed by the user via use of the controls 437. In addition, while the motors 438 are illustrated in FIG. 4 for only one of the near-to-eye display systems, each near-to-eye display system may have its own one or more motors in some embodiments, and in some embodiments one or more motors may be used to control (e.g., independently) each of multiple near-to-eye display systems.

While the described techniques may be used in some embodiments with a display system similar to that illustrated, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens, as discussed elsewhere herein. In other embodiments, the user may view one or more images through one or more optical lens that are produced in manners other than via a display panel, such as on a surface that reflects light from another light source (e.g. laser scan beam) in part or in whole.

Example Display Systems

Figure 5:
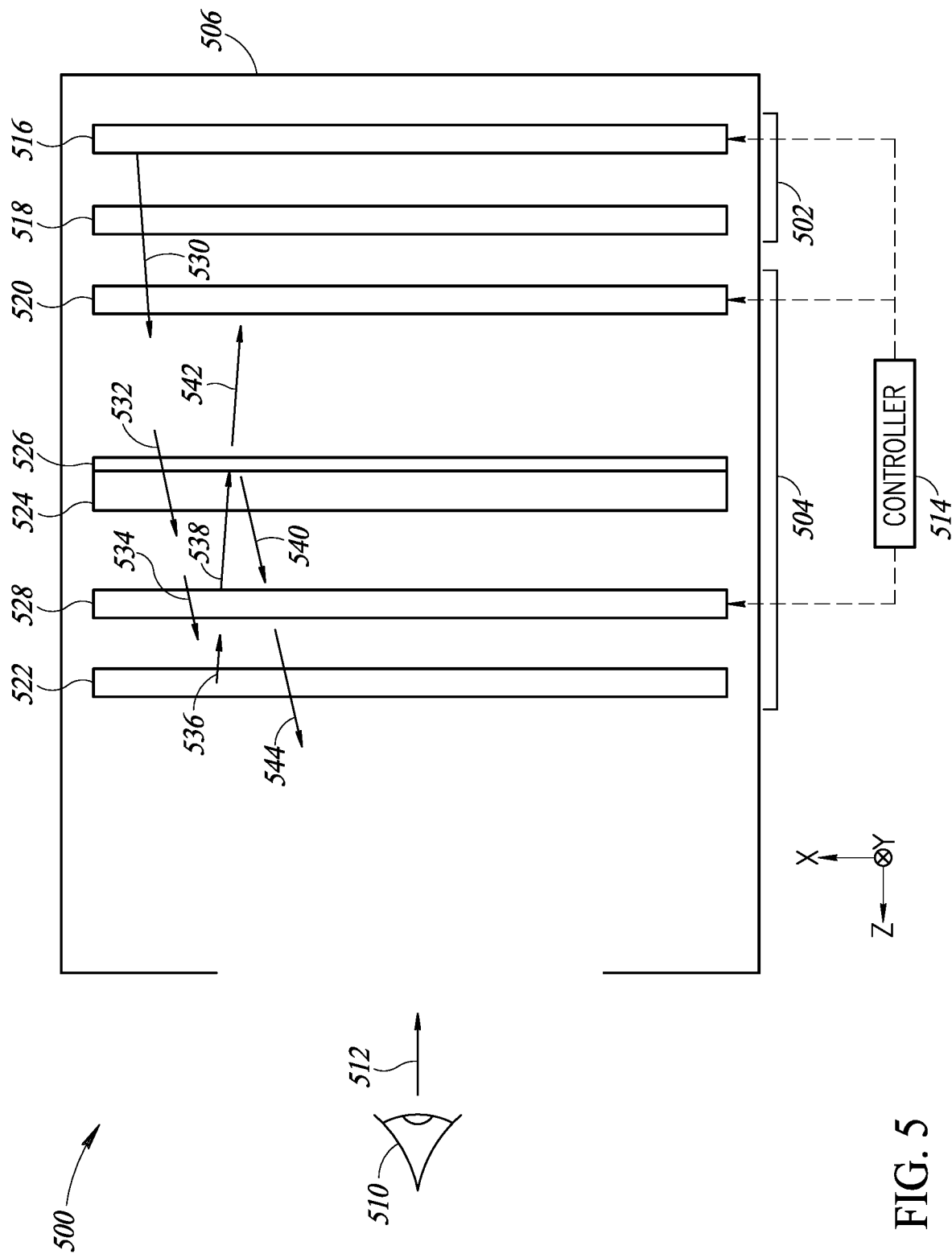
FIG. 5 is a sectional view of an HMD device showing a display subsystem and an optical system thereof, according to one non-limiting illustrated implementation.

FIG. 5 is a sectional side view of a head-mounted display system 500 that includes a display system 502 and an optical system 504 supported by a support structure 506, such as a housing, helmet, goggles, glasses, or other headwear. The support structure 506 supports the display system 502 and optical system 504 in front of the user's eyes (e.g., eye 510) as the user views the system in the Z-axis direction indicated by the arrow 512 shown in FIG. 5. Control circuitry 514 may optionally be coupled to one or more components of the optical system 504 or the display system 502, as discussed elsewhere herein. As an example, the display system 502 and optical system 504 may be similar or identical to the display systems and optical systems discussed above with reference to FIG. 4. The display system 502 and the optical system 504 may be operative to display images to the user 510. As discussed further below, the optical system 504 may utilize catadioptric or "pancake" optics to provide images to the eye 510 of the user from the display system 502. The spacing and size of the components of the head-mounted display system 400 may differ from what is illustrated. As an example, components that are shown as being spaced apart from each other may be positioned adjacent each other, in a different order, etc.

The display system 502 includes a source of images such as a pixel array 516. The pixel array 516 may comprise a two-dimensional array of pixels that emits light. As non-limiting examples, the pixel array 516 may include a liquid crystal display (LCD), a liquid crystal on silicon (LCoS) display, an organic light emitting diode (OLED) display, etc.

A linear polarizer 518 may be positioned in front of the pixel array 516 to provide polarized light from the pixel array 516. In at least some implementations, the pixel array 516 may generate linearly polarized light by design so the linear polarizer 518 may be omitted. As an example, the linear polarizer 518 may have a transmission or pass axis that is aligned with the X-axis shown in FIG. 5.

The optical system 504 may include a spatially varying polarizer 520 positioned in front of the linear polarizer 518. As discussed further below, the spatially varying polarizer 520 may provide variable retardance across an optical window thereof, which enables the spatially varying polarizer to provide polarization compensation for a wire grid polarizer 522 of the optical system 502, which minimizes the variance over wavelength and angle of incidence of the wire grid polarizer. The spatially varying polarizer 520 may include a wave retarder, such as a multi-twist retarder, that is formed of birefringent materials. Birefringence is the property of a material that has a refractive index that depends on the polarization and propagation direction of light. The wave retarder alters the polarization state or phase of light traveling through the wave retarder. The wave retarder may have a slow axis (or extraordinary axis) and a fast axis (ordinary axis). As polarized light travels through the wave retarder, the light along the fast axis travels more quickly than along the slow axis.

The spatially varying polarizer 520 may be aligned such that its fast axis is aligned at 45 degrees to the transmission axis of the linear polarizer 518. The spatially varying polarizer 520 may be mounted in front of the linear polarizer 518 and optionally attached thereto.

The optical system 504 further includes a lens element that includes a lens portion 524 and a partially reflective mirror or surface 526. The lens portion 524 and the partially reflective mirror 526 may be formed as a single component or multiple components. The optical system 504 further includes a quarter wave plate 528 positioned between the lens portion 524 and the wire grid polarizer 522.

Although shown as being planar for illustrative purposes, the lens portion 524 or other components of the display system 502 or optical system 504 may be non-planar (e.g., plano-convex, plano-concave, etc.). Further, the optical system 504 may include additional or fewer optical structures, such as refractive or diffractive lenses, partially reflective coatings, wave plates, reflective polarizers, linear polarizers, antireflection coatings, additional spatially varying polarizers, or other optical structures that allow light rays from the display system 502 to be focused at the user's eye 510 with a desired optical power.

A non-limiting example of how light may pass through the display system 502 and the optical system 504 of the head-mounted display system 500 is now described with reference to light rays 530-544 (arrows) shown in FIG. 5. Image light ray 530 may exit the pixel array 516 and pass through the linear polarizer 518, where it becomes linearly polarized in alignment with the transmission axis of the linear polarizer 518. In the illustrated example, the transmission axis of the linear polarizer 518 may be aligned with the X-axis shown in FIG. 5.

After passing through the linear polarizer 518, the ray 530 passes through the spatially varying polarizer 520 and becomes circularly polarized. Additional discussion of the operation of the spatially varying polarizer 520 is provided elsewhere herein.

The circularly polarized ray 530 from the spatially varying polarizer 520 strikes the partially reflective mirror 526, and a portion of the ray passes through the partially reflective mirror as ray 532. The ray 532 is refracted or diffracted (partially focused) by the shape or characteristics of the lens portion 524 of the lens element.

The ray 532 is circularly polarized. The quarter wave plate 528 converts the ray 532 into linearly polarized light ray 534 with a linear polarization aligned with the Y-axis of FIG. 5.

The wire grid polarizer 522 may be positioned proximate to or adjacent the quarter wave plate 528. The wire grid polarizer 522 may have orthogonal reflection and transmission (or pass) axes. Light that is polarized parallel to the reflection axis of the wire grid polarizer 522 is reflected by the wire grid polarizer, and light that is polarized parallel to the transmission axis passes through the wire grid polarizer 522. In the illustrated example, the wire grid polarizer 522 may have a reflection axis that is aligned with the Y-axis, so the ray 534 reflects from the wire grid polarizer as reflected ray 536.

The reflected ray 536 has a linear polarization aligned with the Y-axis shown in FIG. 5. After passing through the quarter wave plate 528, the reflective ray 536 becomes circularly polarized ray 538. Circularly polarized ray 538 passes through the lens portion 524, and a portion of the ray 538 is reflected by the partially reflective mirror 526 as reflected ray 540. The portion of the ray 538 that is transmitted by the partially reflective mirror 526 as transmitted ray 542 is converted from circularly polarized light to linearly polarized light by the spatially varying polarizer 520. The linearly polarized light has a polarization aligned with the Y-axis shown in FIG. 5 such that the ray 542 is absorbed by the linear polarizer 518.

As noted above, the reflected ray 540 is circularly polarized. After passing back through the lens portion 524 and the quarter wave plate 528, the ray 540 becomes linearly polarized as ray 544 having its polarization aligned with the X-axis, which is parallel to the transmission axis of the wire grid polarizer 522. Accordingly, the ray 544 passes through the wire grid polarizer 522 to provide a viewable image to the eye 510 of the user.

As discussed above, the spatially varying polarizer 520 may provide phase retardation that varies a function of position, e.g., horizontal position, vertical position, radial position, across a field of view (e.g., on-axis to off-axis) which provides polarization compensation for the wire grid polarizer 522, which is sensitive to wavelength and angle of incidence. The particular manner in which the retardation of the spatially varying polarizer 520 varies may be dependent on the specific configuration and materials of the wire grid polarizer 520 or other components, such as the polarization state of incident light, incident angle(s), materials, geometry of various components, etc.

Figure 6:
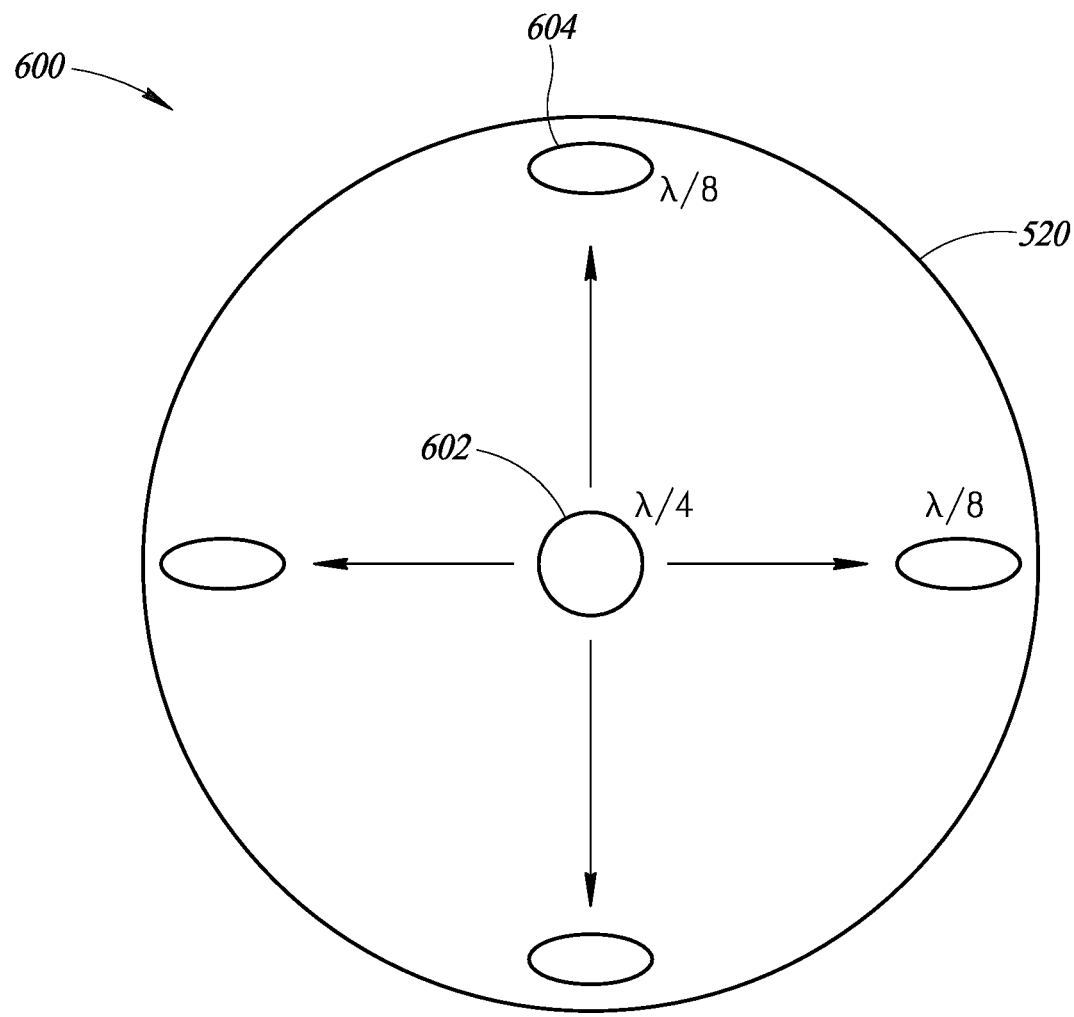
FIG. 6 is a plan view of an example spatially varying polarizer of the optical system shown in FIG. 5, according to one non-limiting illustrated implementation.

FIG. 6 shows a non-limiting example plan view 600 of the spatially varying polarizer 520, showing a retardation pattern thereof. In this example, the spatially varying polarizer 520 is configured to provide circular or quarter-wave ($\lambda/4$) retardation at the center 602 of the optical window, and the retardation gradually (e.g., linearly, non-linearly) decreases toward the periphery 604 where the spatially varying polarizer provides elliptical or octadic-wave ($\lambda/8$) retardation. Generally, the spatially varying polarizer 520 may provide retardation that varies in any way as a function of position, and the amounts of retardation may be any value (e.g., $\lambda/20$, $\lambda/10$, $\lambda/8$, $\lambda/4$, $\lambda$, $2\lambda$) operative to provide polarization compensation for the wire grid polarizer 520. Further, the amount of retardation may increase only in one or more directions, decrease only in one or more directions, or both increase and decrease. The amount of retardation may vary continuously or gradually, or may vary in a number of steps (e.g., two steps, 10 steps). The amount of retardation may vary according to any type of function including, for example, linear functions, polynomial functions, exponential functions, step functions, other types of functions, or combinations thereof.

As noted above, in at least some implementations, the spatially varying polarizer 520 may be formed of a multi-twist retarder (MTR), which is a waveplate-like retardation film that provides precise and customized levels of broadband, narrowband or multiple band retardation in a single thin film. More specifically, MTR comprises two or more twisted liquid crystal (LC) layers on a single substrate and with a single alignment layer. Subsequent LC layers are aligned directly by prior layers, allowing simple fabrication, achieving automatic layer registration, and resulting in a monolithic film with a continuously varying optic axis.

In at least some implementations, the controller 514 may be operatively coupled to the spatially varying polarizer 520 to selectively vary the spatially-dependent phase retardation of the spatially varying polarizer to any desired configuration. In other words, the spatially varying polarizer 520 may be selectively switchable. In such implementations, one or more thin-film transistor layers may be provided that allow the spatially-dependent phase retardation of the spatially varying polarizer 520 to be selectively controlled by the controller 514 in any desired manner. The controller 514 may control the phase retardation at any desired rate, such as one time only, periodically, at a rate that is equal to a frame rate of the display system 502 or a fraction thereof, etc.

In at least some implementations, the positions of the quarter wave plate 528 and the spatially varying polarizer 520 may be switched. In at least some implementations, the quarter wave plate 528 may be replaced with a spatially varying polarizer that is similar or identical to the spatially varying polarizer 520, such that the optical system 504 includes two (or more) spatially varying polarizers.

By utilizing the spatially varying polarizers discussed herein, optical designers have significantly more degrees of freedom to produce optical systems that have improved performance and efficiency, which allows for display systems that provide a better viewing experience, cost less, are smaller in size or weight, consume less power, and provide other advantages that will be apparent to those skilled in the art.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A head-mounted display system, comprising:
a display subsystem operative to generate images comprising linearly polarized light; and
an optical system, comprising:
a lens element that receives light from the display subsystem, the lens element comprising a partially reflective surface;
a wire grid polarizer that receives light from the lens element;
a quarter wave plate positioned between the lens element and the wire grid polarizer; and
a spatially varying polarizer positioned between the display subsystem and the lens element, the spatially varying polarizer having a retardance that varies across an optical window of the spatially varying polarizer to compensate off axis light incident on the wire grid polarizer.

2. The head-mounted display system of claim 1 wherein the spatially varying polarizer comprises a multi-twist retarder.

3. The head-mounted display system of claim 1 wherein the spatially varying polarizer provides quarter-wave retardation at a center of the optical window, and gradually decreases the retardation toward the periphery of the optical window.

4. The head-mounted display system of claim 3 wherein the spatially varying polarizer provides octadic-wave retardation at the periphery of the window.

5. The head-mounted display system of claim 1 wherein the spatially varying polarizer provides a first retardation at a center of the optical window and provides a second retardation at the periphery of the optical window, wherein the second retardation is less than the first retardation.

6. The head-mounted display system of claim 1 wherein the retardation of the spatially varying polarizer varies linearly or non-linearly across the optical window.

7. The head-mounted display system of claim 1, further comprising:
control circuitry operatively coupled to the spatially varying polarizer, the control circuitry operative to selectively adjust the retardation provided by the spatially varying polarizer.

8. A head-mounted display system, comprising:
a display subsystem operative to generate images comprising linearly polarized light; and
an optical system, comprising:
a quarter wave plate that receives light from the display subsystem;
a lens element that receives light from the quarter wave plate, the lens element comprising a partially reflective surface;
a wire grid polarizer that receives light from the lens element; and
a spatially varying polarizer positioned between the lens element and the wire grid polarizer, the spatially varying polarizer having a retardance that varies across an optical window of the spatially varying polarizer to compensate off axis light incident on the wire grid polarizer.

9. The head-mounted display system of claim 8 wherein the spatially varying polarizer comprises a multi-twist retarder.

10. The head-mounted display system of claim 8 wherein the spatially varying polarizer provides quarter-wave retardation at a center of the optical window, and gradually decreases the retardation toward the periphery of the optical window.

11. The head-mounted display system of claim 10 wherein the spatially varying polarizer provides octadic-wave retardation at the periphery of the window.

12. The head-mounted display system of claim 8 wherein the spatially varying polarizer provides a first retardation at a center of the optical window and provides a second retardation at the periphery of the optical window, wherein the second retardation is less than the first retardation.

13. The head-mounted display system of claim 8 wherein the retardation of the spatially varying polarizer varies linearly or non-linearly across the optical window.

14. The head-mounted display system of claim 8, further comprising:
control circuitry operatively coupled to the spatially varying polarizer, the control circuitry operative to selectively adjust the retardation provided by the spatially varying polarizer.

15. A head-mounted display system, comprising:
first and second near-to-eye display systems, each of the first and second near-to eye display systems comprising:
a display subsystem operative to generate images comprising linearly polarized light; and
an optical subsystem, comprising:
a lens element that receives light from the display subsystem, the lens element comprising a partially reflective surface;
a wire grid polarizer that receives light from the lens element;
a quarter wave plate positioned between the lens element and the wire grid polarizer; and
a spatially varying polarizer positioned between the display subsystem and the lens element, the spatially varying polarizer having a retardance that varies across an optical window of the spatially varying polarizer to compensate off axis light incident on the wire grid polarizer.

16. The head-mounted display system of claim 15 wherein the spatially varying polarizer comprises a multi-twist retarder.

17. The head-mounted display system of claim 15 wherein the spatially varying polarizer provides quarter-wave retardation at a center of the optical window, and gradually decreases the retardation toward the periphery of the optical window.

18. The head-mounted display system of claim 17 wherein the spatially varying polarizer provides octadic-wave retardation at the periphery of the window.

19. The head-mounted display system of claim 15 wherein the spatially varying polarizer provides a first retardation at a center of the optical window and provides a second retardation at the periphery of the optical window.

20. The head-mounted display system of claim 15 wherein the retardation of the spatially varying polarizer varies linearly or non-linearly across the optical window.

* * * * *